United States Patent
Spiesberger

(10) Patent No.: US 6,304,515 B1
(45) Date of Patent: Oct. 16, 2001

(54) MATCHED-LAG FILTER FOR DETECTION AND COMMUNICATION

(75) Inventor: John Louis Spiesberger, 6 Derring Dale Rd., Radnor, PA (US) 19087

(73) Assignee: John Louis Spiesberger, Radnor, PA (US)

(*) Notice: Subject to any disclaimer, the term of this patent is extended or adjusted under 35 U.S.C. 154(b) by 0 days.

(21) Appl. No.: 09/453,336

(22) Filed: Dec. 2, 1999

(51) Int. Cl.[7] ..................................................... G01S 3/80

(52) U.S. Cl. .......................... 367/124; 367/131; 342/378; 455/67.1

(58) Field of Search .................................. 367/124, 125, 367/131, 134; 342/378; 455/40, 501, 63, 67.1

(56) References Cited

U.S. PATENT DOCUMENTS 6,047,192 * 4/2000 Maloney et al. ..................... 455/456
6,160,758 12/2000 Spiesberger .

OTHER PUBLICATIONS

Whalen, "Detection of Signals in Noise," Academic Press, New York, pp. 378–379 (1971).
Bucker, "Use of calculated sound fields and matched–field detection to locate sound sources in shallow water," *J. Acoust. Soc. Am.*, 59: 368–373 (1976).
Paulraj et al., "Space–time processing for wireless communications," *IEEE Signal Processing*, 14: No. 5, pp. 49–83 (1997).
Spiesberger, "Locating animals from their sounds and tomography of the atmosphere," *J. Acoust. Soc. Am.*, 106: pp. 837–846 (1999).
Price, "Optimum detection of random signals in noise, with applition to scatter–multipath communication, I," *IRE Trans. on Information Theory*, IT–2, No. 4, pp. 125–135 (1956).
Davis, "The detectability of random signals in the presence of noise," *Trans.I.R.E.*, PGIT–3: pp. 52–62 (1954).
Youla, "The use of the method of maximum likelihood in estimating continuous–modulated intelligence which has been corrupted by noise," *Trans.I.R.E.*, PGIT–3, pp. 90–105, (1954).
Middleton, "On the detection of stochastic signals in additive normal noise–Part I," *I.R.E Trans. on Information Theory* IT–3, pp. 86–121 (1957).

(List continued on next page.)

*Primary Examiner*—Ian J. Lobo

(57) ABSTRACT

A detection problem is introduced for a source of some bandwidth and unknown waveform and emission time in the presence of noise of uncertain variance. The signal travels to the receivers along paths whose delays may be unknown. Using a new receiver called a "matched-lag filter," the presence or absence of the signal is estimated from the auto- and cross-correlation functions of the received signals. The use of correlation functions provides the first stage of gain in signal-to-noise ratio, like a matched filter, because the paths are assumed to be partially coherent with one another. The second stage achieves additional gain by searching only over the physically possible arrangements of signals in the auto- and cross-correlation functions. These stages enable the matched-lag filter to behave like a matched filter within a matched filter. In a simple case, simulations of the matched-lag filter yield probabilities of detection that are, with one and two receivers, 4.5 to 290 times respectively that obtained from the alternative energy detector at a false-alarm probability of 0.001. The matched-lag filter has applications to communications and the detection of broadband signals such as from animals, vehicles, ships, nuclear blasts, and seismic events, and blind estimation of the impulse response of a multipath channel.

20 Claims, 5 Drawing Sheets

OTHER PUBLICATIONS

Spiesberger, "Linking auto– and cross–correlation functions with correlation equations: Application to estimating the relative travel times and amplitudes of multipath," *J. Acoust. Soc. Am.* 104: pp. 300–312 (1998).

Spiesberger, "Identifying cross–correlation peaks due to multipaths with application to optimal passive localization of transient signals and tomographic mapping of the environment," *J. Acoust. Soc. Am.*, 100: pp. 910–917 (1996).

Spiesberger, "Detecting multipath signals with the matched–lag filter," *Proc. 1999 I.E.E.E. International Conference on Acoustics, Speech, and Signal Processing*, pp. 1189–1192 (1999).

Peterson et al., "The theory of signal detectability," *Trans. I.R.E.*, PGIT–4: pp. 171–212 (1954).

Helstrom, "Statistical Theory of Signal Detection," Pergamon Press, New York, pp. 112–115 and 151 (1968).

Price et al., "A Communication Technique for Multipath Channels," *Proc. of The IRE*, 46, pp. 555–570 (1958).

Lourtie et al., "Signal detectors for random ocean media," *J. Acoust. Soc. Am.*, 92: pp. 1420–1424 (1992).

Kelly et al., "The detection of radar echoes in noise," *J. Soc. Ind. Appl. Math.*, 8: pp. 309–341 (1960).

Gradshteyn et al., "Table of Integrals Series and Products," Academic Press, New York, p. 662 (1965).

Casella et al., "Statistical Inference," Wadsworth and Brooks/Cole, Pacific Grove, pp. 148–151 (1990).

Arnold, "Mathematical Statistics", Prentice–Hall, New Jersey, pp. 243 (1990).

North, "An analysis of the factors which determine signal/noise discrimination in pulsed–carrier systems," RCA Lab report PTR–6C, RCA report was published in 1943.

* cited by examiner

MATCHED-LAG FILTER FOR DETECTION AND COMMUNICATION

STATEMENT REGARDING FEDERALLY SPONSORED RESEARCH AND DEVELOPMENT

This invention was made with Government support under Grant No. N00014-97-1-0613 awarded by the Office of Naval Research. The Government has certain rights in this invention.

BACKGROUND-FIELD OF THE INVENTION

In general, the present invention relates to the utilization of auto-correlation and cross-correlation functions in methods for detecting and communicating data from one or more sources of a primary signal when the primary signal has a waveform that is not known at one or more receivers at the outset.

BACKGROUND-DESCRIPTION OF PRIOR ART

The energy detector is the traditional method for detecting signals of uncertain emitted waveform (Whalen, *Detection of signals in noise*, Academic Press, New York, pp. 411, 1971). If the waveform was known, one could use the matched filter to enhance the detection of the signal (North, RCA Laboratory Report PTR-6C; (reprinted in Proc. I.E.E.E. 51, 1016–1027, 1963), 1943). However without knowledge of the waveform, the energy detector is the only prior alternative. The energy is the sum of the squares of samples from the received signal. If the energy changes by more than noise alone would likely allow, one decides that one or more signals are present, with some accompanying probability of error.

The main deficiency of the energy detector is that is probabilities of detection may not be as large as desired.

The prior-art most closely related to the present invention is discussed by Spiesberger in a U.S. Pat. No. 6,160,758. In that invention, the relative travel times of multipath are estimated using a plurality of input channels (claims 1, 7, 9). Claim 10 in that application discusses a means for blindly estimating both the lags and amplitudes of multipath from a plurality of channels. In that invention, a set of new correlation equations are used to solve for the relative travel times and amplitudes of the multipath. The invention is U.S. Pat. No. 6,160,758 does not provide a method for estimating the relative travel times or amplitudes of multipath when data are taken on only one channel.

SUMMARY

The matched-lag filter provides methods for detecting multipath signals from one or more sources collected at one or more receivers with significantly higher probabilities of detection than can be obtained with the energy detector. As a result, the matched-lag filter offers a new way to detect multipath signals, and it offers a new way to communicate information in multipath conditions. The matched-lag filter also offers a new way for blindly estimating the amplitudes and relative travel times of multipath between a source of primary signal and at least one input channel.

OBJECTS AND ADVANTAGES

In order to detect signals with higher probabilities of detection than previously possible, a new method is developed for detecting broadband signals of unknown waveform that travel to one or more receivers along many paths. The theory has applications to acoustic and electromagnetic wireless communications, and to the detection of signals from calling animals, ships, vehicles, nuclear blasts, seismic events and other broadband phenomenon of acoustic and electromagnetic origin. Simulations of this theory in this paper indicate that it is able to detect signals with significantly larger probabilities of detection than the alternative method based on the energy of the signal at the receivers (Whalen, 1971).

The method is developed as a binary detection problem where the data consist of either noise or signal plus noise. It is assumed that the signal travels along an uncertain number of paths to each receiver because of reflections or refraction within the environment. The amplitude and emission time of the transmitted signal may be unknown, as may be the travel times of the paths. The lack of information about a library of transmitted waveform shapes may preclude the use of detection methods based on the matched filter (North, 1943). The method does not require a model for the propagation of waves in the media. If such information is provided, such as from matched-field processing (Bucker, Journal Acoust. Soc. Am. 59, 368–373 1976), it can be used to enhance the probability of detection. The signal's bandwidth must be sufficiently wide so that some paths arrive at intervals exceeding the inverse bandwidth of the signal. It is assumed that the variance of the noise is imperfectly known, either because one does not know when the signal is on or off, or because the noise is not stationary, or because the variance is estimated from the data.

Signals that cannot be reliably modeled may occur when acoustic or electromagnetic waves propagate above ground where the locations of boundaries such as the ground, trees, rocks, buildings etc. are unknown (Paulraj and Papadias, *IEEE Signal Processing Magazine*, 14, no. 5, 49–83, 1997; Spiesberger, Journal Acoust. Soc. Am., 106, 837–846, 1999), or when transient or long-lived broadband sounds propagate in water with complicated bathymetry, or when electromagnetic waves propagate through the ionosphere (Price, IRE Transactions on Information Theory, IT-2, no. 4, 125–135, 1956).

Signals that can be reliably modeled may occur when low frequency acoustic waves propagate through deep water, or through the Earth following earthquakes or nuclear blasts. The detection of all these signals has been of interest for a long time.

In the new method, use is made of the auto-correlation function when there is one receiver. For more than one receiver, all the auto- and cross-correlation functions are used. The use of all these correlation functions for detecting the signal appears to be novel. They offer a natural starting point because they provide the standard gain obtained with a matched filter (North, 1943) when the signals from the paths are partially coherent with one other.

Perhaps the most distinguishing feature of the new receiver is its use of the physically possible arrangements of signal lags in the auto- and cross-correlation functions. Multipath signals have been detected using arrival patterns that are modeled stochastically, such that the auto-correlation function of the multipath signals is assumed to be known ahead of time (Price, 1956; Davis, Transactions I.R.E., PGIT-3, 52–62, 1954; Youla, Transactions I.R.E., PGIT-3, 90–105, 1954; Middleton, I.R.E. Transactions on Information Theory, IT-3, 86–121, 1957). This assumption allows signals to occur at any lags in the auto-correlation function, but indeed there are many lag arrangements that are forbidden. Take, for example, three paths arriving at a receiver. There are at most 3(3−1)/2=3 signal-related peaks at positive lags in the autocorrelation function (Spiesberger, Journal Acoustical Society of America, 100,

| t(2) | Occupied Lags | | |
|---|---|---|---|
| 1 | 1 | 4 | 5 |
| 2 | 2 | 3 | 5 |
| 3 | 2 | 3 | 5 |
| 4 | 1 | 4 | 5 |

910–917, 1996). The lags of these peaks must satisfy the "lag-equations" (Spiesberger, 1996), $$\tau_{ii}(m,n)=t_i(m)-t_i(n); m>n \geq 1, \quad (1)$$

where the travel time for path m at reciever i is $t_i(m)$. It is impossible to have lags 2, 4, and 5 simultaneously occupied by signals where sample times are counted by their sample number. To see this, the difference in sample number between the third and first paths must be 5, to yeild a signal at lag 5. This leaves one additional path which could arrive at sample numbers 1, 2, 3, or 4. None of theses possibilities yields signals at lags 2, 4, and 5 (Table I). There are also forbidden arrangements of signals in auto- and cross-correlation functions. Lag-equations have been found which describe the allowance arrangements of signals in these functions when there are two or more recievers (Spiesberger, Journal of the Acoustical Society of America, 104, 300–312, 1998).

So detecting the signals described in the first paragraph can involve more than looking at signal-to-noise ratios. Indeed, it is shown that the allowed lag arrangements in auto- and cross-correlation functions can be used to design a "matched-log filter" (Spiesbergher, Proc. 1999 I.E.E.E. International Conference on on Acoustics, Speech, and Signal Processing, III, 1189–1192, 1999) and thereby increase the probability of detection compared with conventional receivers which base their decision on the received energy.

Based upon the above-identified problems with respect to the related art, it is therefore a purpose of the matched-lag filter to utilize auto-correlation and cross-correlation functions in order to detect at least one source.

Another purpose of the matched-lag filter is to provide a method of utilizing auto-correlation and cross-correlation functions in order to communicate information from one or more sources of a primary signal to at least one receiver.

Another purpose of the matched-lag filter is to provide a method for estimating the impulse response of a multipath environment from at least one source to at least one input channel. This approach differs from that in U.S. Pat. No. 6,160,758 by Spiesberger wherein two or more channels are required for blindly estimating the impulse response.

The method of detecting signals of the matched-lag filter comprise the steps of: collecting signals, some of which may be multipath, from at least one input channel; optionally filtering multipath signals collected from one or more input channels in order to suppress noise; utilizing auto-correlation functions and cross-correlation functions of the channels in order to gain signal-to-noise ratio, utilizing only the physically possible arrangements of signal lags to search the auto-correlation and cross-correlation functions for the presence of signals; estimating the probabilities for the total number of sources and the probabilities for the total number of multipath from each source; and estimating the probability of false-alarm and probability of detection for the presence of the sources.

For purposes of communication, the estimates for the multipath lags can also be used to correct for multipath aberrations to enhance the rate at which data are transmitted. Even without correcting for multipath aberrations, the ability to detect signals that are too weak to be detected by other means offers a new way to transmit data at either lower signal-to-noise ratios than previously possible, or to enhance the quality of the received data because of the enhanced probabilities of detection.

These as well as other novel advantages, details, embodiments, features and objects of the present invention will be apparent to those skilled in the art from the following detailed description of the invention, the attached claims and accompanying drawings, listed hereinbelow, which are useful in explaining the invention.

DRAWING FIGURES

In the text which follows and in the drawings, wherein similar reference numerals denote similar elements throughout the several views thereof, the present invention is explained with reference to illustrate embodiments, in which.

Figure 1:
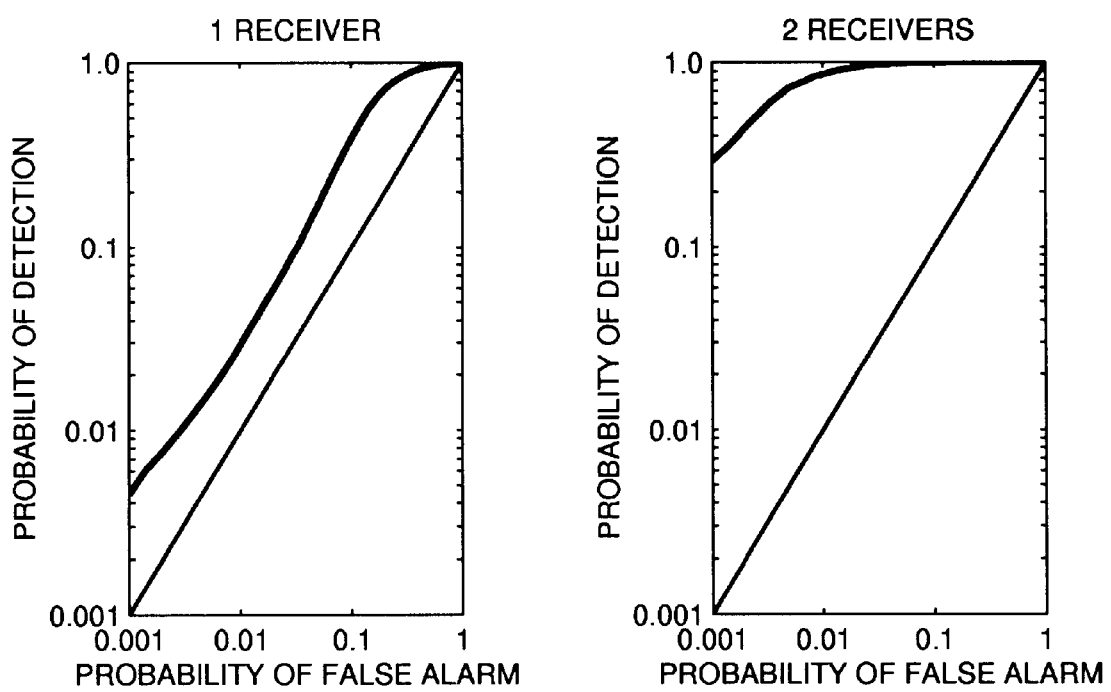
FIG. 1 shows simulated receiver operating curves for the conventional energy detector (thin line) and the matched-lag filter (thick line) for one (left) and two (right) receivers respectively.

Table I exemplifies the idea of allowed and forbidden arrangements of signal-occupied lags in an autocorrelation function.

Table II shows the number of signal to the number of noise arrangements in correlation functions as a function of the number of receivers.

DESCRIPTION OF PREFERRED EMBODIMENTS

For a better understanding of the matched-lag filter, reference may be had to the following detailed description taken in conjunction with the appended claims and accompanying drawings.

I. THE MATCHED-LAG FILTER: GENERAL FORMULATION

Many types of data can be used for detecting signals in noise, such as the variance at a receiver, the Fourier coefficients of a time series, etc. (Peterson et al., Transactions I.R.E., PGIT-4, 171–212, 1954). The data for the matched-lag filter come from the auto- and cross-correlation functions. These functions are particularly useful for detecting signals of unknown waveform because they yield a gain in the signal-to-noise ratio when the time-bandwidth product of the signal exceeds unity and when the paths are partially or entirely coherent with one another.

With R receivers, there are $R(R+1)/2$ different auto- and cross-correlation functions that can be formed. The series at receiver j is, $$\vec{r}_j, j=1,2,3,\ldots,R,$$

where $\vec{r}_j$ is a K×1 vector denoting K measurements (Spiesberger, 1998). The auto- and cross-correlation functions at non-negative lags are, $$R_{ij}(p) \equiv \frac{1}{K} \sum_{k=1+p}^{K} r_i(k) r_j(k-p); \quad 1 \le i \le j \le \mathcal{R}; p \ge 0, \quad (2)$$

where the indices on k go from 1 to K+p for p less than zero and $i \ne j$ for cross-correlation functions. The kth row of $\vec{r}_j$ is $r_j(k)$. The data for the matched-lag filter are put in a vector, $$\vec{R} \equiv [\vec{R}_{ij}], \quad 1 \le i \le j \le \mathcal{R}, \quad (3)$$

where only non-negative lags are used for auto-correlation functions.

Under hypothesis $H_0$, the data for the matched-lag filter are due to noise only and have joint density function $f(\vec{R}|H_0)$. The conditional probability of X given Y is denoted by $f(X|Y)$.

A. Joint Density Function for the Correlation Functions Under Hypothesis $H_1$

The signal bearing lags in the auto-correlation function have a deterministic structure given by Eq. (1). The equations are exact when there is 1) no interference between paths leading to a correlation peak being shifted in lag-space, and 2) no lack of coherence between paths in the auto and cross-correlation functions. In practice, the lag equations are useful when there is interference and degradation of coherence as long as the correlations between paths lead to peaks near the lags specified in the lag-equations (Spiesberger, 1996; Spiesberger, 1999).

Assume that $Q(i)$ is the upper bound for the difference in travel times between the last and first paths at receiver i. Further assume that the travel times of the paths coincide with the time that a datum is sampled at the receiver. Then one can generate all the allowed arrangements of signals in auto-correlation functions by synthesizing all ways of arranging $N_i-1$ relative travel times, $$t_i(m) - t_i(1), m=2,3,4,\ldots N_i \quad (4)$$

without replacement, among $Q(i)$ travel time bins where $N_i$ is the number of paths at receiver i. There are, $$B_i(N_i) \equiv \binom{Q(i)}{N_i - 1}, \quad (5)$$

such arrangements. The $b_i$th arrangement of $N_i-1$ relative travel times determines the $P_i'(b_i, N_i)$ positive lags, $$\psi_i(p|b_i, N_i); p=1,2,3,\ldots,P_i'(b_i, N_i), \quad (6)$$

where signals occur in the auto-correlation function. The number of signal-related lags, $P_i'(b_i, N_i)$, satisfies, $$N_i - 1 \le P_i'(b_i, N_i) \le P_i(N_i), \quad (7)$$

where the maximum number of resolved signals at positive lag is (Spiesberger, 1996), $$P_i(N_i) = N_i(N_i-1)/2. \quad (8)$$

One obtains less than $P_i(N_i)$ resolved signal lags when two or more pairs of travel time differences are the same.

The lag equations which relate auto- with cross-correlation functions are (Spiesberger, 1998), $$\tau_{ii}(q,1) = \tau_{ij}(q,n) - \tau_{ij}(1,n); i \ne j, \quad (9)$$

where, i=1, 2, 3, ... R
j=1, 2, 3, ... R
n=1, 2, 3, ... $N_j$; for i<j
n=1; for i>j
q=2, 3, ... $N_i$.

Arrangements $b_i$ and $b_j$ of relative travel times at receivers i and j do not by themselves specify the difference in travel times between the first paths, $\tau_{ij}(1, 1) = t_i(1) - t_j(1)$. The maximum time required for energy to propagate between the receivers is, $$D_{ij} = d_{ij}/c, \quad (10)$$

where $c_{ij}$ is the minimum speed at which energy propagates, and $d_{ij}$ is the distance between the receivers. Since we know that $-D_{ij} \le \tau_{ij}(1, 1) \le +D_{ij}$, there are $2D_{ij}+1$ possible lags in which $\tau_{ij}(1, 1)$ can occur in the cross-correlation function. Note that we only need to specify $\tau_{1j}(1, 1)$ for j=2, 3, 4, ..., R in order to determine the lags, $\tau_{ij}(1, 1), 2 \le i < j \le R$, because $\tau_{ij}(1, 1) = \tau_{1j}(1, 1) - \tau_{1i}(1, 1)$.

When Eqs. (1,9) are used to specify the arrangements of signals in the correlation functions, their joint probability density function can be written as, $$f(\vec{R}|H_1) = \sum_{\vec{b}, \vec{\tau}_{1j}(1,1), \vec{N}} f(\vec{R}|\vec{b}, \vec{\tau}_{1j}, \vec{N}) f(\vec{b}, \vec{\tau}_{1j}(1,1), \vec{N}), \quad (11)$$

where $\vec{b} = (b_1, b_2, b_3, \ldots, b_R), \vec{\tau}_{1j}(1, 1) = (\tau_{12}(1, 1), \tau_{13}(1, 1), \ldots, \tau_{1R}(1, 1))$, and $\vec{N}(N_1, N_2, N_3, \ldots, N_R)$. The sum is over all possible combinations of the vectors. In practice, there are physical limits which impose upper and lower bounds for the number of paths at each receiver. These bounds constrain the number of possible combinations in the sum to a finite number. Hypothesis $H_1$ specifies that signal and noise are present.

The matched-lag filter can be written for more than one source by including sums on the number of different sources with their conditional probabilities. This is an obvious generalization, but is too cumbersome for an introductory paper.

B. Decision Statistic for the Matched-Lag Filter

It is common to have imperfect knowledge about the probability density function of the noise. It is then useful to form average liklihood ratios (Helstrom, *Statistical Theory of Signal Detection*, Pergammon, New York, 1968) in order to account for this uncertainty. The averages of the joint density functions are denoted by $$\overline{f(\vec{R}|H_0)} \text{ and } \overline{f(\vec{R}|H_1)}$$

and the average liklihood ratio is (Helstrom, 1968), $$\overline{\Lambda} = \frac{\overline{f(\vec{R}|H_1)}}{\overline{f(\vec{R}|H_0)}}. \tag{12}$$

Using the Neyman-Pearson criterion, the decision on whether the data consist of noise or signal plus noise is made by first choosing an acceptable probability of false-alarm, $Q_0$. The decision threshold, $\Lambda_0$, is found through, $$Q_0 = \int_{\Lambda_0}^{\infty} f(\overline{\Lambda}|H_0) d\overline{\Lambda}, \tag{13}$$

where $f(\overline{\Lambda}|H_0)$ is the density function of the average liklihood ratio under hypothesis $H_0$. Given data, if $\overline{\Lambda} \leq \Lambda_0$, one chooses hypothesis $H_0$. Otherwise, one chooses hypothesis $H_1$. The probability of detection is given by, $$Q_d = \int_{\Lambda_0}^{\infty} f(\overline{\Lambda}|H_1) d\overline{\Lambda}, \tag{14}$$

where $f(\overline{\Lambda}|H_1)$ is the density function under hypothesis $H_1$.

II. THE MATCHED-LAG FILTER WITH AN ANALYTICAL SOLUTION: AN IDEALISTIC CASE AND STARTING ASSUMPTIONS

The average liklihood ratio for the matched-lag filter has an analytical form for an idealistic case. This form is useful for getting a feel for the potential of using this receiver in other situations. The liklihood ratio will be evaluated for one and two receivers. When signals are present, it is assumed that the number of paths at each receiver, N, is a known constant. We assume that Q(i)=Q for all receivers and $D_{12}$=D. Sections III through VI continue the development of the matched-lag filter for the idealistic case.

Under hypothesis $H_0$, the measurements, $$r_j(k) = e_j(k); j=1,2, \tag{15}$$

at two points, j=1, 2, consist of k=1, 2, 3, . . . , K mutually uncorrelated Gaussian random variables, $e_j(k)$, with mean zero and imperfectly known variance, $\rho^2$. It is further assumed that the noise is uncorrelated between receivers i and j.

The mathematical structure of the filter can be expressed in a straightforward manner when, under hypothesis $H_1$, the K measurements contain N delayed and attenuated replicas of an emitted signal, s(k), plus additive noise, $$r_j(k) = \sum_{n=1}^{N} as(k - t_j(n)) + e_j(k), \; j = 1, 2. \tag{16}$$

It is assumed, for simplicity, that the amplitude, a, of each path is the same. Travel time is measured in units of the sample number at the receiver.

In this paper, the matched-lag filter utilizes correlation functions only for lags p which obey $|p|<<K$ and $K>>1$. The statistical formulation is simpler to develop under this situation. Since the largest possible difference in travel time between the first and last paths is Q (Sec. I), $|p| \leq Q$.

In most situations, the auto-correlation function of the emitted signal has an unknown shape. This problem is too difficult to deal with in an introductory paper. Instead, the matched-lag filter will be evaluated in an ideal situation where it is assumed that the emitted signal has an auto-correlation function that is like a delta function, $$\sum_{k=1}^{K} s(k)s(k-p) \equiv \mathcal{E}\delta(p), \tag{17}$$

where $\delta(p)$ is one when p is zero and is zero otherwise. The energy in the emitted signal is, $$\mathcal{E} \equiv \sum_{k=1}^{K} s^2(k). \tag{18}$$

In this situation, interference between paths does not change the lags at which the signal peaks occur in the correlation functions.

III. JOINT DENSITY FUNCTIONS UNDER HYPOTHESIS $H_0$: THE IDEALISTIC CASE

When $|p|<<K$, the variance of the positive lags in the auto-correlation function, and the variance of the lags in the cross-correlation function is, $$\sigma_0^2 \equiv \overline{(R_{ij}(p) - \overline{R_{ij}(p)})^2} \cong \frac{(\rho^2)^2}{K}, \tag{19}$$

(Appendix A).

When only noise is present, the joint probability density function of the first Q positive lags in the auto-correlation function is (Appendix A), $$f(\vec{R}_{ii}|H_0) = f(\vec{R}_{ii}|\sigma_0^2, H_0) f(\sigma_0^2); i=1,2, \tag{20}$$

where the conditional density, $$f(\vec{R}_{ii}|\sigma_0^2, H_0) = (2\pi\sigma_0^2)^{-Q/2} \exp\left[-\frac{1}{2\sigma_0^2}\sum_{q=1}^{Q} R_{ii}^2(q)\right]; \tag{21}$$

$$i = 1, 2, Q \ll K$$

describes a mutually uncorrelated zero mean Gaussian random variable. The conditional probability for the variance of the noise is $f(\sigma_0^2)$.

Similarly, the joint density of the cross-correlation function is (Appendix A), $$f(\vec{R}_{12}|H_0) = f(\vec{R}_{12}|\sigma_0^2, H_0) f(\sigma_0^2). \tag{22}$$

where the conditional density is, $$f(\vec{R}_{12}|\sigma_0^2, H_0) = (2\pi\sigma_0^2)^{-L/2} \exp\left[-\frac{1}{2\sigma_0^2}\sum_{l=-L_1}^{L_1} R_{12}^2(l)\right]. \tag{23}$$

The total number of lags used from the cross-correlation function is, $$L=2(Q+D)+1=2L_1+1, \tag{24}$$

where the most negative and positive lags are $-L_1$ and $L_1$ respectively and where $L_1<<K$.

The matched-lag filter will use all the data from the two auto-correlation functions (except lag zero for now) and the cross-correlation function. The joint density function of these three correlation functions is (Appendix A), $$f(\vec{R}_{11}, \vec{R}_{22}, \vec{R}_{12}|H_0) = f(\vec{R}_{11}|\sigma_0^2, H_0) f(\vec{R}_{22}|\sigma_0^2, H_0) f(\vec{R}_{12}|\sigma_0^2, H_0) f(\sigma_0^2). \quad (25)$$

A. Average Density Functions

In order to obtain simple analytical expressions, a variable, $$x \equiv \frac{1}{\sigma_0^2}, \quad (26)$$

is introduced which is assumed to be uniformly distributed on the interval $\check{x} \leq x \leq \hat{x}$, so its density function is, $$f(x) = \frac{1}{\hat{x} - \check{x}}. \quad (27)$$

This method of parameterizing the noise is not made to necessarily coincide with a realistic case, but rather to explore the behavior of matched-lag filters when the variance of the noise is uncertain.

Substituting x into Eq. (20) yields, $$f(\vec{R}_{ii}|H_0) = f(\vec{R}_{ii}|x, H_0) f(x). \quad (28)$$

Its average is, $$\overline{f(\vec{R}_{ii}|H_0)} = \int_{\check{x}}^{\hat{x}} f(\vec{R}_{ii}|x, H_0) f(x) dx; \; i = 1, 2, \quad (29)$$

$$= \frac{1}{(\hat{x} - \check{x})} \frac{1}{(2\pi)^{Q/2}} \mu_{\vec{R}_{ii}}^{-(\frac{Q}{2}+1)}$$

$$\left[\gamma\left(\frac{Q}{2} + 1, \mu_{\vec{R}_{ii}} \hat{x}\right) - \gamma\left(\frac{Q}{2} + 1, \mu_{\vec{R}_{ii}} \check{x}\right)\right],$$

where, $$\mu_{\vec{R}_{ii}} \equiv \frac{1}{2} \sum_{l=1}^{Q} R_{ii}^2(l), \quad (30)$$

and the incomplete gamma function (Gradshteyn and Ryzhik, *Table of Integrals Series and Products*, Academic, New York, 1965) is, $$\gamma(a, b) \equiv \int_0^b e^{-t} t^{a-1} dt. \quad (31)$$

The average value of the density function from two auto- and one cross-correlation function (Eq. (25)) is, $$\overline{f(\vec{R}_{11}, \vec{R}_{22}, \vec{R}_{12}|H_0)} \equiv \int_{\check{x}}^{\hat{x}} f(\vec{R}_{11}|x, H_0) f(\vec{R}_{22}|x, H_0) \quad (32)$$

$$(\vec{R}_{12}|x, H_0) f(x) dx$$

$$= \frac{1}{(\hat{x} - \check{x})} \frac{1}{(2\pi)^{Q + \frac{L}{2}}} \mu_1^{-(Q+\frac{L}{2}+1)}$$

$$\left[\gamma\left(Q + \frac{L}{2} + 1, \mu_1 \hat{x}\right) - \right.$$

-continued $$\left. \gamma\left(Q + \frac{L}{2} + 1, \mu_1 \check{x}\right)\right],$$

where, $$\mu_1 \equiv \frac{1}{2}\left(\left\{\sum_{p=1}^{Q} R_{11}^2(p) + R_{22}^2(p)\right\} + \sum_{n=-L_1}^{L_1} R_{12}^2(n)\right). \quad (33)$$

IV. JOINT DENSITY FUNCTIONS FOR AUTO-CORRELATION FUNCTIONS UNDER HYPOTHESIS $H_1$: THE IDEALISTIC CASE

A. Allowed Arrangements of Signals

Since N paths arrive at each receiver, the number of allowed signal arrangements in each auto-correlation function is the same, namely $B_i(N)$ from Eq. (5). The $b_i$th arrangement can be characterized by the lags, $\psi_i(p|b_i, N)$; $p=1, 2, 3, \ldots, P_i'(b_i, N)$, at which signals occur and the redundancy, $\eta_i(p|b_i, N)$, $p=1, 2, 3, \ldots, P_i'(b_i, N)$ at each of those lags. All redundancies have values greater than or equal to one. The $b_i$th allowed lag-redundancy set is defined to consist of $2P_i'(b_i, N)$ elements, $$\{\psi_i(p|b_i, N), \eta_i(p|b_i, N)\}, \; p=1, 2, 3, \ldots, P_i'(b_i, N).$$

Some of these arrangements are the same, because there are two sets of different relative travel times that yield the same arrangement. For example, the two travel time sets, $t_i \in \{0, 1, 3\}$ and $t_i \in \{0, 2, 3\}$ both yield the same positive auto-correlation function lags 1, 2, and 3, and redundancy functions, $\eta(p)=1, 2,$ and 1 for $p=1, 2,$ and 3 respectively. In other words, lags 1 and 3 are resolved, and lag 2 has contributions from two pairs of paths. From this example, it is seen that all travel time sets which are time reversals of one another generate the same lag-redundancy set. This can be proven by first computing the auto-correlation function for the travel times $t_i(n), n=1, 2, 3, \ldots, N$, which has signals at positive lags given by Eq. (1). Then one computes the lags at which signals occur for their time reversals, $-t_i(n)$, $n=1, 2, 3, \ldots, N$, which has signals at lags, $$\tau_{ii}(m,n) = -t_i(m) - (-t_i(n)) = -(t_i(m) - t_i(n)); N \geq m > n \geq 1,$$

which are all the opposites of the lags in Eq. (1). One then notes that the lags in the auto-correlation function are symmetric about zero.

The number of symmetrical travel time sets can be computed (Appendix B). As Q increases, the ratio of the number symmetrical to unsymmetrical sets gets small. The redundancy function at a particular lag is either one or two. It is equal to one only when the $b_i$th arrangement comes from a symmetrical set of relative travel times.

B. Probability Density Functions for Auto-correlation Functions

A resolved signal has a value of, $$A = \frac{\alpha^2 \mathcal{E}}{K}, \quad (34)$$

in both the auto- and cross-correlation functions (Appendix A). When signal and noise are present, the variance of the noise and reverberation in an auto-correlation function is, $$\sigma_1^2 = \sigma_0^2\left[1 + 2\left(1 + \frac{N-1}{4Q}\right)l^2\right], \quad (35)$$

where the time-averaged signal-to-noise intensity ratio over K samples at the receiver is, $$l^2 = \frac{AN}{\rho^2}, \quad (36)$$

(Appendix A). The covariance of the non-signal component does not vanish for all lag combinations (Eq. (A11)). When the matched-lag filter's performance is evaluated in Sec. VIII, it will be assumed that the time-averaged intensity signal-to-noise ratio is small at the receiver, so $l^2 \ll 1$. In this regime, the covariance of the non-signal component is negligible compared with its variance, $\sigma_1^2$ (Appendix A). The non-signal components in the auto-correlation function may then be approximated as being mutually uncorrelated Gaussian random variables with zero means and variances $\sigma_1^2$.

The joint density function of the positive lags in auto-correlation function i can now be written as, $$f(\vec{R}_{ii}|H_1) = \sum_{b_i=1}^{B_i(N)} f(\vec{R}_{ii}|b_i, \sigma_1^2) f(b_i) f(\sigma_1^2), \quad (37)$$

where the conditional probability is, $$f(\vec{R}_{ii}|b_i, \sigma_1^2) = \quad (38)$$

$$(2\pi\sigma_1^2)^{-Q/2} \exp\left[-\frac{1}{2\sigma_1^2} \sum_{p=1}^{P_i'(b_i,N)} (R_{ii}(\psi_i(p|b_i,N)) - \eta_i(p|b_i,N)A)^2 - \frac{1}{2\sigma_1^2} \sum_{p=P_i'(b_i,N)+1}^{Q} R_{ii}^2(\Psi_i(p|b_i,N))\right]; i = 1, 2,$$

where $\Psi_i(p|b_i, N)$ are the lags where no signals occur at positive lag. The probability of obtaining the $b_i$th allowed arrangement of signals will be taken to be the one of most ignorance, so it will be uniformly distributed as, $$f(b_i) = \frac{1}{B_i(N)}. \quad (39)$$

This means that each of the $B_i(N)$ travel time sets in Eq. (4) is equally likely.

1. Average Density Functions for Auto-correlation Functions

In order to average over uncertainties in the variance of the noise at the receiver we define, $$y \equiv \frac{1}{\sigma_1^2}, \quad (40)$$

to be uniformly distributed on the interval $\check{y} \leq y \leq \hat{y}$, so its density function is, $$f(y) = \frac{1}{\wedge_{-\check{y}}^{\hat{y}}}. \quad (41)$$

The average of $f(\vec{R}_{ii}|H_1)$ in Eq. (37) is, $$\overline{f(\vec{R}_{ii}|H_1)} \equiv \int_{\check{y}}^{\hat{y}} f(y) f(\vec{R}_{ii}|H_1) dy \quad (42)$$

$$= \frac{f(y)}{(2\pi)^{Q/2}} \frac{1}{B_i(N)} \sum_{b_i=1}^{B_i(N)} \mu_{b_i}^{-\left(\frac{Q}{2}+1\right)}$$

$$\left[\gamma\left(\frac{Q}{2}+1, \mu_{b_i}\hat{y}\right) - \gamma\left(\frac{Q}{2}+1, \mu_{b_i}\check{y}\right)\right],$$

where, $$\mu_{b_i} \equiv \frac{1}{2}\sum_{l=1}^{Q} R_{ii}^2(l) + \frac{A^2}{2}\sum_{p=1}^{P_i'(b_i,N)} \eta_i(p|b_i,N)^2 - \quad (43)$$

$$A \sum_{p=1}^{P_i'(b_i,N)} \eta_i(p|b_i,N) R_{ii}(\psi_i(p|b_i,N)).$$

V. JOINT DENSITY FUNCTIONS FOR TWO AUTO- AND ONE CROSS-CORRELATION FUNCTION UNDER HYPOTHESIS $H_1$: THE IDEALISTIC CASE

A. Modeling the Noise and Reverberation

The variance of the noise plus reverberation in the cross-correlation function is, $$\alpha_1^2 = \sigma_0^2(1+2l^2), \quad (44)$$

(Appendix A). We see that the variances of the noise plus reverberation in the auto- and cross-correlation functions are approximately the same when $N-1 \ll 4Q$ (Eqs. (35,44)). A simple approximation is made so that the variances of the noise in the auto- and cross-correlation functions are approximated by their weighted average, $$\beta^2 \equiv \frac{2Q\sigma_1^2 + L\alpha_1^2}{2Q+L}. \quad (45)$$

This weighting is chosen because there are 2Q positive auto-correlation lags and L cross-correlation lags. We assume for simplicity that the true variance of the non-signal components is the same in each function.

The covariance of the non-signal components is approximated to be zero in the cross-correlation function because of the low signal-to-noise intensity ratio that is assumed to exist at the receiver (Eq. (A12)). Similarly, the covariance of the non-signal components in the auto- and cross-correlation functions is negligible at low signal-to noise intensity ratios at the receiver (Eq. (A14)). Thus the non-signal components are approximated as 2Q+L mutually uncorrelated Gaussian random variables with mean zero and variance $\beta^2$.

B. Allowed Arrangements

The number of lags that contain a signal in the the cross-correlation function is denoted, $$M(b_i,b_j) \leq N^2, \quad (46)$$

which depends on the arrangements of relative travel times at the two receivers. The maximum value of $N^2$ occurs when all the signal-related lags are resolved. The lags at which they occur in the cross-correlation function are $\tau_{12}(1, 1)+\phi_{ij}(p|b_i, b_j)$, p=1, 2, 3, ..., $M(b_i, b_j)$ where $-D \leq \tau_{12}(1, 1) \leq D$. The relative travel times of the paths are assumed to be statistically independent at the two receivers, so all the allowed arrangements are equally likely.

C. Density Function

Following Eq. (11), we write an expression for the joint density function of the data in all the correlation functions as, $$f(\vec{R}|H_1) = \sum_{i=1}^{B_i(N)} f(\vec{R}_{11}|b_i, \beta^2, H_1) \sum_{j=1}^{B_j(N)} f(\vec{R}_{22}|b_j, \beta^2, H_1) \quad (47)$$

$$\sum_{\tau_{12}(1,1)=-D}^{D} f(\vec{R}_{12}|b_i, b_j, \tau_{12}(1,1), \beta^2, H_1)$$

$$f(b_i)f(b_j)f(\tau_{12}(1,1))f(\beta^2),$$

Note that the density functions for the two auto-correlation functions are independent except for their condition on $\beta^2$. We define the density function of $\tau_{12}(1, 1)$ to be the one of least information, so it has a uniform density, $$f(\tau_{12}(1, 1)) = \frac{1}{2D+1}. \quad (48)$$

The density functions for the auto-correlation functions are given by Eq. (37), except $\sigma_1^2$ is replaced with $\beta^2$. Finally, the conditional density of the cross-correlation function is, $$f(\vec{R}_{12}|b_i, b_j, \tau_{12}(1,1), \beta^2, H_1) = (2\pi\beta^2)^{-L/2} \quad (49)$$

$$\exp\left[\frac{-1}{2\beta^2} \sum_{n=1}^{M(b_i,b_j)} (R_{12}(\tau_{12}(1,1)+\phi_{ij}(n|b_i, b_j)) - \zeta_{ij}(n|b_i, b_j)A)^2 - \right.$$

$$\left. \frac{1}{2\beta^2} \sum_{n=M(b_i,b_j)+1}^{L} R_{12}^2(\Phi_{ij}(n|b_i, b_j, \tau_{12}(1,1)))\right],$$

where the number of signal pairs at relative lag $\phi_{ij}(n|b_i, b_j)$ in the cross-correlation function is, $\zeta_{ij}(n|b_i,b_j) \geq 1$, and the lags without signals in the cross-correlation function are, $\Phi_{ij}(n|b_i,b_j,\tau_{12}(1, 1)); n=M(b_i,b_j)+1, \ldots, L.$ (50)

D. Average Density Function

As before, the variance of the noise is parameterized as, $$w \equiv \frac{1}{\beta^2}, \quad (51)$$

with a uniform density on the interval $\check{w} \leq w \leq \hat{w}$, $$f(w) = \frac{1}{\hat{w} - \check{w}}. \quad (52)$$

Then the average density of the positive lags in the two auto-correlation functions and the L lags in the cross-correlation function is, $$\overline{f(\vec{R}|H_1)} = \int_{\check{w}}^{\hat{w}} f(\vec{R}|H_1)f(w)dw \quad (53)$$

$$= \frac{f(w)}{(2\pi)^{Q+\frac{L}{2}}} \frac{1}{B_i(N)B_j(N)(2D+1)}$$

$$\sum_{b_i=1}^{B_i(N)} \sum_{b_j=1}^{B_j(N)} \sum_{\tau_{12}(1,1)=-D}^{D} (\mu_{ij}|b_i, b_j, z)^{-(Q+\frac{L}{2}+1)}$$

$$\left[\gamma\left(Q+\frac{L}{2}+1, \mu_{ij}(b_i, b_j, \tau_{12}(1,1))\hat{w}\right) - \right.$$

$$\left.\gamma\left(Q+\frac{L}{2}+1, \mu_{ij}(b_i, b_j, \tau_{12}(1,1))\check{w}\right)\right],$$

where, $$\mu_{ij}(b_i, b_j, \tau_{12}(1,1)) \equiv \mu_1 + \quad (54)$$

$$-A \sum_{p=1}^{P_i'(b_i,N)} \eta_i(p|b_i, N)R_{11}(\psi_i(p|b_i, N)) -$$

$$A \sum_{p=1}^{P_j'(b_j,N)} \eta_j(p|b_j, N)R_{22}(\psi_j(p|b_j, N)) -$$

$$A \sum_{p=1}^{M_{ij}(b_i,b_j)} (\zeta_{ij}|b_i, b_j)R_{12}(\tau_{12}(1,1)) +$$

$$\phi_{ij}(p|b_i, b_j)) + \frac{A^2}{2}\left(\sum_{p=1}^{P_i'(b_i,N)} \eta_i^2(p|b_i, N) + \right.$$

$$\left.\sum_{p=1}^{P_j'(b_j,N)} \eta_j^2(p|b_j, N) + \sum_{p=1}^{M_{ij}(b_i,b_j)} \zeta_{ij}^2(p|b_i, b_j)\right)$$

VI. AVERAGE LIKLIHOOD RATIOS FOR THE MATCHED-LAG FILTER: THE IDEALISTIC CASE

With one receiver, the average liklihood ratio for the matched-lag filter is obtained from Eq. (12), $$\overline{\Lambda_1} = \frac{\overline{f(\vec{R}_{ii}|H_1)}}{f(\vec{R}_{ii}|H_0)}, \quad (55)$$

where the numerator and denominator come from Eqs. (42) and (29) respectively. Similarly, the average liklihood ratio with two receivers is, $$\overline{\Lambda_2} = \frac{\overline{f(\vec{R}|H_1)}}{f(\vec{R}_{11}, \vec{R}_{22}, \vec{R}_{12}|H_0)}, \quad (56)$$

where the numerator and denominator come from Eqs. (53) and (32) respectively.

VII. AVERAGE LIKLIHOOD RATIOS FOR A CONVENTIONAL RECEIVER: THE ENERGY DETECTOR

The conventional energy detector is one that could be used to detect the kinds of signals hypothesized for the matched-lag filter. It decides if the signal is present based on the energy at the receiver. This detector utilizes the data at the collection point, as opposed to the correlation functions used by the matched filter.

Suppose Z mutually uncorrelated Gaussian random variables, $\vec{z}$, with mean zero and variance $\epsilon_0^2$ are measured at a receiver under hypothesis $H_0$. Under hypothesis $H_1$, we suppose the Z samples consist of the same kind of random variable except the variance is $\epsilon_1^2$. Suppose both variances are uncertain. Under hypothesis $H_0$, the average density function of the data is, $$\overline{f(\vec{z}|H_0)} = \int_{\check{\epsilon}_0^2}^{\hat{\epsilon}_0^2} \frac{1}{(2\pi\epsilon_0^2)^{Z/2}} \exp\left[-\frac{1}{2\epsilon_0^2}\sum_{i=1}^{Z} z^2(i)\right] f(\epsilon_0^2) d\epsilon^2, \quad (57)$$

and under hypothesis $H_1$ the average density is, $$\overline{f(\vec{z}|H_1)} = \int_{\check{\epsilon}_1^2}^{\hat{\epsilon}_1^2} \frac{1}{(2\pi\epsilon_1^2)^{Z/2}} \exp\left[-\frac{1}{2\epsilon_1^2}\sum_{i=1}^{Z} z^2(i)\right] f(\epsilon_1^2) d\epsilon^2, \quad (58)$$

where the lower and upper bounds for the variance are denoted by $\check{\epsilon}^2$ and $\hat{\epsilon}^2$ respectively. Note that the only datum used in this receiver is the energy $\Sigma_{i=1}^{Z} z^2(i)$.

Because we are concerned about cases where the variance of the noise is uncertain, we change variables, $$u_z \equiv \frac{1}{\epsilon_0^2}, \quad (59)$$

$$v_z \equiv \frac{1}{\epsilon_1^2}, \quad (60)$$

and assume the density functions for these variables are uniform, $$f(u_z) \equiv \frac{1}{\hat{u}_z - \check{u}_z}, \quad (61)$$

$$f(v_z) \equiv \frac{1}{\hat{v}_z - \check{v}_z}. \quad (62)$$

The density functions simplify to, $$\overline{f(\vec{z}|H_0)} = \frac{1}{\mu_z^{\frac{Z}{2}+1}(\hat{u}_z - \check{u}_z)(2\pi)^{\frac{Z}{2}}}\left[\gamma\left(\frac{Z}{2}+1, \mu_z\hat{u}_z\right) - \gamma\left(\frac{Z}{2}+1, \mu_z\check{u}_z\right)\right], \quad (63)$$

$$\overline{f(\vec{z}|H_1)} = \frac{1}{\mu_z^{\frac{Z}{2}+1}(\hat{v}_z - \check{v}_z)(2\pi)^{\frac{Z}{2}}}\left[\gamma\left(\frac{Z}{2}+1, \mu_z\hat{v}_z\right) - \gamma\left(\frac{Z}{2}+1, \mu_z\check{v}_z\right)\right], \quad (64)$$

where, $$\mu_z \equiv \frac{1}{2}\sum_{i=1}^{Z} z^2(i), \quad (65)$$

with bounds, $$\hat{\mu}_z \equiv \frac{1}{\check{\epsilon}_0^2}; \check{u}_z \equiv \frac{1}{\hat{\epsilon}_0^2}; \hat{v}_z \equiv \frac{1}{\check{\epsilon}_1^2}; \check{v}_z \equiv \frac{1}{\hat{\epsilon}_1^2}.$$

The average liklihood ratio for the energy detector is, $$\overline{\Lambda_3} = \frac{\overline{f(\vec{z}|H_1)}}{\overline{f(\vec{z}|H_0)}}, \quad (66)$$

where the numerator and denominator come from Eqs. (64) and (63) respectively.

VIII. EXAMPLES

A. One Receiver

Receiver operating curves (Peterson et al., 1954) are plotted from 10,000 simulations of the the average liklihood ratios in Eqs. (55,66) for the matched-lag filter and the energy detector respectively for, N=3 (# paths)

Q=7 (Maximum difference in travel time from first to last path)

$$10\log_{10}\frac{A^2}{\sigma_1^2}$$

=0.9 (dB for resolved signal in the auto-correlation function)

K=1000 (# of samples digitized at the receiver), (67)

$I^2$=0.1 signal-to-noise intensity ratio of the digitized samples ±50% variation in the sample standard deviation D=0 (# of time samples for field to go between the receivers)

(left panel, FIG. 1). In this figure, the left panel shows the results for the energy detector (thin line) and the matched-lag filter (thick line) using the values in Eq. (67). The signal-to-noise intensity ratio is derived from Eq. (36). Note that $I^2<<1$ as required for neglecting the off-diagonal terms in the correlation matrix for the noise and reverberation (Appendix A). Also note that Q<<K, as required for assuming stationary values for the noise in the auto-correlation function.

For the values in Eq. (67), the probability of detection and false alarm are equal for the energy detector (thin line, left panel, FIG. 1). This occurs when the density functions for the average liklihood ratios do not change significantly between the noise only state and the signal plus noise state. In our example, the addition of the small amount of signal energy does not increase the sample standard deviation significantly, and the energy detector yields no information regarding the presence or absence of the signal.

On the other hand, the matched-lag filter yields a probability of detection that is about 4.5 times that of the energy detector at a 0.001 probability of false alarm (thick line, left panel, FIG. 1). The matched-lag filter outperforms the energy detector for all false-alarm probabilities plotted.

B. Two Receivers

Receiver operating curves are plotted from 10,000 simulations of the the average liklihood ratios in Eqs. (56,66) for the matched-lag filter and the energy detector respectively for the same values as Eq. (67) except the variation in the sample standard deviation is ±42.29% (right panel, FIG. 1).

As before, the energy detector yields no information about the presence or absence of the signal (thin line, right panel, FIG. 1). On the other hand, the matched-lag filter (thick line, right panel) yields a probability of detection that is about 290 times that of the energy detector at a 0.001 probability of false alarm.

IX. INTERPRETATION

For the idealistic case in FIG. 1, the matched-lag filter outperforms the conventional receiver by significant amounts. The improvement increases sharply with the number of receivers. The matched-lag filter is looking for the allowed arrangements of signals in the correlation functions. It is evidently more difficult for noise to masquerade as one of the signal arrangements with increasing numbers of receivers. The energy detector does not test for the locations of signals in the correlation functions.

The matched-lag filter uses both the signal-to-noise ratios and the allowed locations of the signals in the correlation functions. The use of the allowed arrangements in the correlation functions boosts the probability of detection in a manner that is analogous to that obtained in a matched filter by cross-correlating the received signal with its replica (North, 1943). So we see that the matched-lag filter is a matched filter within a matched filter. This analogy is particularly appropriate considering the fact that the correlation functions for the matched-lag filter already accrue the normal gain in signal-to-noise ratio from the matched filter when the paths are partially coherent with one another.

It is interesting to count the number of lags which contain signals as a function of the number of receivers for particular arrangements of travel times. Suppose there are N paths at each receiver. For simplicity, assume that all signal-related lags are resolved so there are $N(N-1)/2$ and $N^2$ lags (Eqs. 8,46) containing signals in the auto- and cross-correlation functions respectively. The number of signal lags occupied is then, $$\mathcal{L} = \left(\frac{N(N-1)}{2}\right)^R \left(\frac{R(R-1)}{2} N^2\right), \tag{68}$$

where the first and second terms on the right side are the number of lags in the auto- and cross-correlation functions respectively. For N=3, and R=1, 2, 3, and 4, the numbers of lags containing signals are L=3,162,729, and 4,374 respectively. Thus, the signal pattern becomes more complex and intertwined within the correlation functions with the number of receivers. This structure contributes to the increased probability of detection with R.

It is interesting to see how sparse the allowed arrangements of signals are in the correlation functions in comparison with the number of ways in which the noise can arrange itself. It seems that as the relative numbers of signal arrangements decrease, the probability of detection ought to increase.

Suppose for simplicity that Q and L are respectively the numbers of lags used from each auto- and cross-correlation function. Suppose the number of paths at each receiver is N so the number of allowed signal-arrangements at each receiver is B, which is independent of i now (Eq. (5)). Assume the allowed signal arrangements are independent between receivers. Recall that specifying $\tau_{1j}(1, 1)$, j=1, 2, 3, . . . , R specifies the values of $\tau_{ij}(1, 1)$ in all the cross-correlation functions. So for one receiver, there are B signal arrangements. For two receivers, there are $B^2L$ signal arrangements. For three receivers, there are $B^3L^2$ signal arrangements. For R receivers there are, $$A(R) = B^R L^{R-1}, \tag{69}$$

signal arrangements.

The number of noise arrangements is estimated by assuming that each lag in a correlation function can be in two states. In the first state, the value of the noise-only correlate looks like noise. In the second state, it looks like signal plus noise. For the Q positive lags in the auto-correlation function, there are $2^Q$ arrangements of correlation values. Generalizing this to all the correlation functions, and realizing that all the correlation lags for the matched-lag filter are mutually uncorrelated when noise is present (Appendix A), the number of ways in

|  | # Paths | | |
|---|---|---|---|
| # Receivers | 2 | 3 | 4 |
| 1 | −1.3 | −0.78 | −0.56 |
| 2 | −5.9 | −4.9 | −4.5 |
| 3 | −15 | −14 | −13 |
| 4 | −29 | −27 | −26 |
| 5 | −47 | −44 | −43 | which the noise can arrange itself is, $$\mathcal{N}(R) = \left(\prod_{r=1}^{R} 2^Q\right)\left(\prod_{j=1}^{R-1}\prod_{k=j+1}^{R} 2^L\right) = 2^{RQ+LR(R-1)/2}. \tag{70}$$

The first and second terms in the middle are the arrangements due to auto- and cross-correlation functions respectfully. Note that we do not account for the probability that noise can masquerade as signal plus in this calculation.

The ratio, $$Y \equiv \frac{\mathcal{A}(R)}{\mathcal{N}(R)} = \exp\left[-R\left(\frac{L(R-1)}{2} + Q\right)\ln 2 + (R-1)\ln L + R\sum_{j=Q-N+2}^{Q} \ln j - R\sum_{j=1}^{N-1} \ln j\right], \tag{71}$$

expresses the number of signal arrangements to the number of noise arrangements. We see that Y goes quickly with the number of receivers (>1) with leading $$O\left(\exp - \frac{LR^2 \ln 2}{2}\right)$$

(Table II). Only a very small fraction of the ways that a correlation function can organize itself can be due to signal, and this fraction decreases with the number of receivers.

X. APPLICATIONS FOR COMMUNICATION

The ability to detect signals that would be otherwise too weak to detect offers several new means for transmitting data in multipath conditions. First, the use of the matched-lag filter would allow the same data to be transmitted with the same reliability but with less energy than other techniques. Second, transmissions could be made that would be difficult to detect with receivers not equipped with the matched-lag filter. Third, it is possible to decrease array complexity and/or array gain at both the transmitter and receiver by utilizing the matched-lag filter to re-coup the lost gain from an array. Fourth, under conditions when the decision is made that signal is present, the joint probability density function for the data in the correlation functions can be used to estimate the number of sources and the impulse response of the channel from each source to each receiver.

One can then use standard techniques, such as done with the RAKE (Price and Green, Proceedings of the IRE, 46, 555–570, 1958) to correct for multipath aberrations, such as intersymbol interference and selective fading, to increase the rate at which data are transmitted or to increase the clarity of the transmitted data.

When the joint probability density function of the correlation functions is used to estimate the impulse response, there may be multiple solutions for the relative travel times of multipath which yield the same output of the correlation functions (Sec. IV, A). One way to resolve this ambiguity is to see which of the multiple solutions yields the largest signal-to-noise ratio from the output of a RAKE receiver. The solution yielding the largest ratio is the estimate of the correct solution for the relative travel times of the paths.

The shape of the transmitted signals' auto-correlation function is often known to a receiver ahead of time. In this case, this known shape would be used in the matched-lag filter in the searching for the physically possible arrangements of lags in the correlation functions. For example, if the signal-related lags encompassing one resolved path pair extends over four samples in the correlation function, then the search over the physically possible arrangements of signal lags would allow for misfit of the order of the peak width when seeking the physically possible arrangements.

The simplest kind of communication system that can be implemented with the matched-lag filter involves a test for the presence or absence of a signal. The presence of a signal could specify one piece of information, and its absence could specify another piece of information. This would constitute an amplitude modulation communication system.

XI. ESTIMATING THE NUMBER OF SOURCES AND PATHS

When it is decided that a signal is present, the number of sources and the number of paths from each source at each receiver can be estimated using the joint probability density function for the correlation output (Eq. 11). One need only add a summation for the number of sources in this equation to allow it to handle a plurality of sources.

One can add filters before and after forming correlation functions to decrease the number of primary signals to be considered for evaluation by the joint probability density function. One such filter can be made by sorting peaks in the correlation functions according to their frequency content. For example, if some of the peaks are derived from a source in one band of frequencies, and the other peaks are derived from a source in a different band, then sorting the correlation peaks into their average peak-frequencies will reveal the presence of two sources. Separating these peaks into two groups helps with the estimation for the number of sources and the estimation of the number of multipath associated with each source.

XII. DISCUSSION

It is emphasized that a physically possible arrangement of signal lags refers to both the set of lags and the ranges of amplitudes of signal components in the correlation functions corresponding to a particular set of relative travel times of multipath and their ranges of multipath amplitudes.

As the number of lags, Q, used by the matched-lag filter increases, the number of signal arrangements increases quickly so that it may be impractical to exactly implement the liklihood ratios for the matched-lag filters using contemporary computers. A future investigation may find approximate formulations of the liklihood ratios that are practical to solve. Sometimes, approximate solutions to otherwise unmanageable problems yield acceptable results, such as have been found for the traveling salesman problem.

One approach which yields computationally tractable solutions is to operate the matched-lag filter in situations where one works with a subset of lags from the correlation functions. For example, when the signal-to-noise ratio is low to moderate in the correlation domain, one can select peaks, and see if these peaks correspond closely to an physically possible arrangement of signal lags. Instead of searching over all possible lag-arrangements, one restricts the search to arrangements which include some of the lags corresponding to picked peaks.

There is the possibility that quantum computers may offer sufficient means to evaluate the liklihood ratios without approximation. Also, the matched-lag filter's implementation is conducive to massively parallel computer architectures because the sums may be evaluated independently.

The matched-lags filter was constructed under the assumption that all travel times arrangements are equally likely. In cases where it is possible to place bounds on the relative travel times of the paths, the a priori probability density function of the lag-redundancy arrangement could be modified to fit expectations to improve the probabilities of detection (Lourtie and Carter, Journal of the Acoustical Society of America, 92, 1420–1424, 1992). It is possible that the matched-lag filter may provide a method that links the detection of broadband signals with matched-field processing (Bucker, 1976).

For simplicity, it was assumed that the amplitude, A, of resolved signal lags in auto-and cross-correlation functions was known. This restriction could be removed using standard statistical approaches (Kelly et al., J. Soc. Ind. Appl. Math., 8, I, 309–341, June, 481–507, September, 481–507, 1960). For example, the amplitude of each path might be assumed to follow a Gaussian distribution with an attendant complexity in the average liklihood ratio.

The matched-lag filter is like a matched filter within a matched filter. The first stage of gain with the matched-lag filter is achieved by using the correlation functions for inputs. Since the paths are assumed to be partially coherent with one other, their cross-correlations accrue the gain in signal-to-noise ratio that is typical of matched filters (North, 1943). The second stage of gain of the matched-lag filter is achieved by searching for the signals only within the space of allowed signal arrangements. The ratio of the number of signal arrangements to the number of noise arrangements gets very small as the numbers of receivers increase.

APPENDIX A: NOISE AND REVERBERLTION IN CORRELATION FUNCTIONS

1. Noise Only

Under hypothesis $H_0$, the joint density function of the correlation function is obtained by substituting Eq. (16) into Eq. (2), $$R_{ij}(p) = \frac{1}{K} \sum_{k=1+p}^{K} e_i(k) e_j(k-p); i = 1, 2; p \geq 0. \tag{A1}$$

Since $R_{ij}(p)$ is a function of random variables, it too is a random variable. Except for lag zero of the auto-correlation function, the mean of $R_{ij}(p)$ is zero because the mean of $e_i(k)$ is zero.

It is straightforward to show that the covariance, $$\overline{R_{ij}(p)R_{ij}(q)} = \frac{1}{K^2}\sum_{k=1+p}^{K}\sum_{l=1+q}^{K}\overline{e_i(k)e_j(k-p)e_i(l)e_j(l-q)}; \quad (A2)$$

$$p, q \geq 0,$$

vanishes when $p \neq q$ (not shown). The covariance also vanishes when p and q can be either sign, as long as $p \neq q$, and $p \neq -q$ when i=j for auto-correlation functions.

When $|p| << K$ and $K >> 1$, $R_{ij}(p)$ is a sum of $K-|p| >> 1$ uncorrelated (Eq. (A1)) random variables. When the variance of $e_i(k)$ is known, $R_{ij}(p)$ approaches a Gaussian random variable because of the central limit theorem. When $|p| << K$, the reader may verify that the variance of the correlates in auto- and cross-correlation functions is given by Eq. (19), and is approximately independent of lag.

Figure 2:
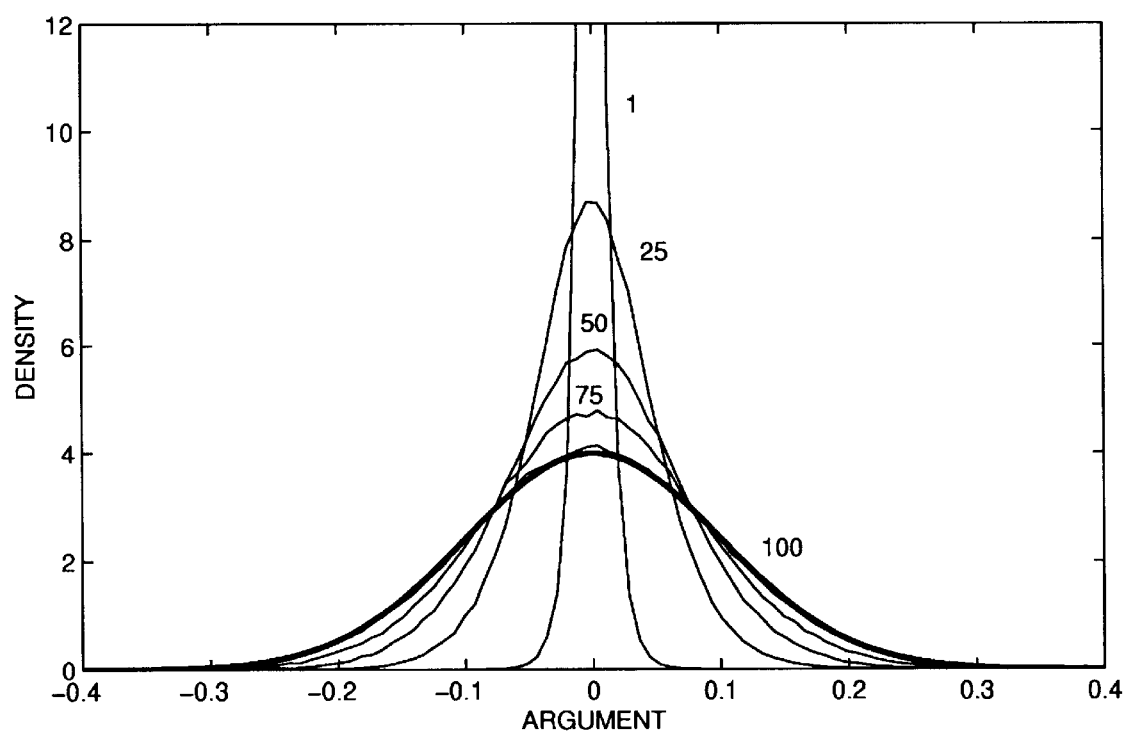
FIG. 2 shows the approach of empirical probability density functions (thin curves) to a density function for a Gaussian random variable (thick curve) as a function of the number of summed products of uncorrelated Gaussian random variables for the empirical functions.
Figure 3:
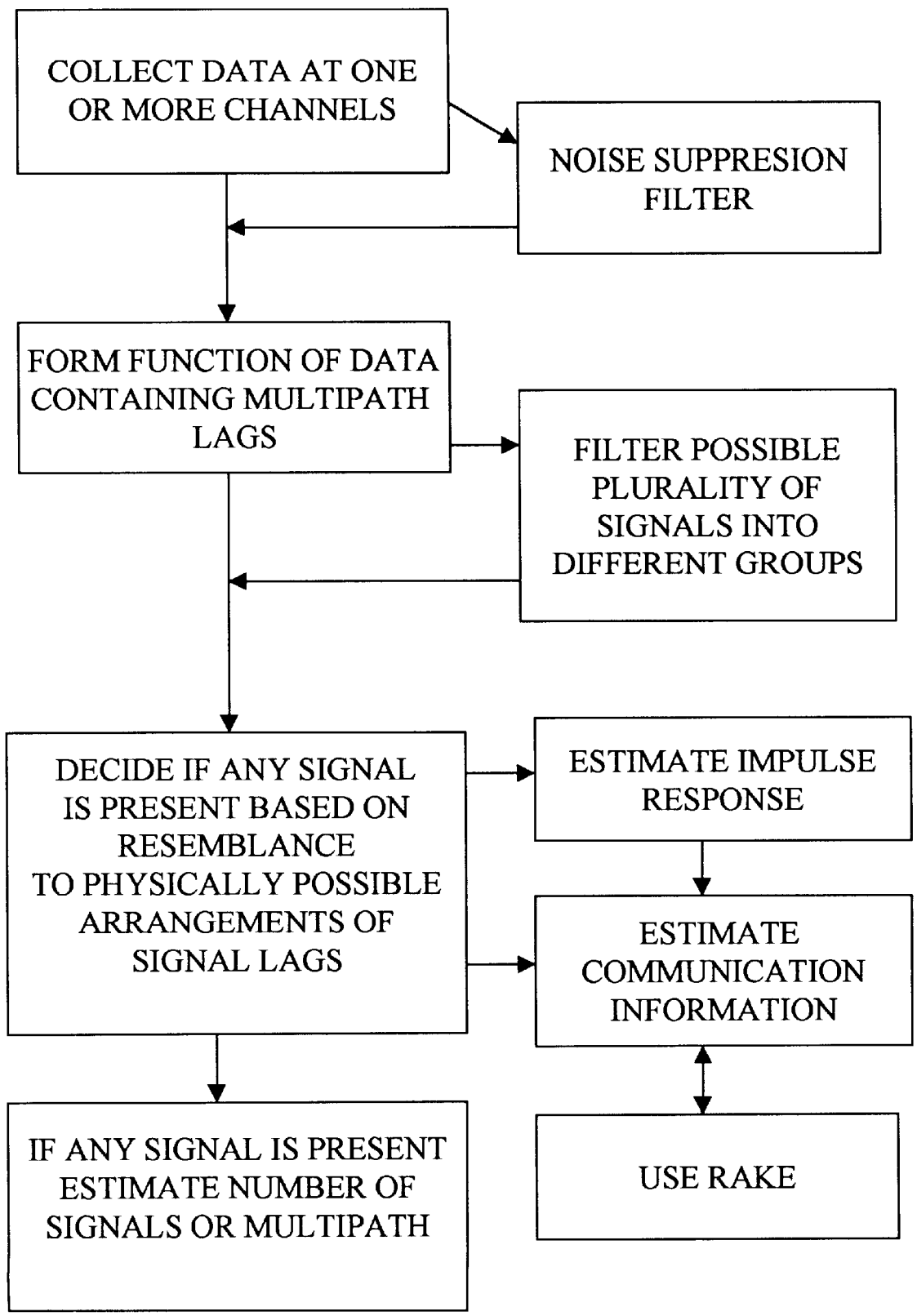
FIG. 3 depicts a block diagram of a signal detection and communication system.
Figure 4:
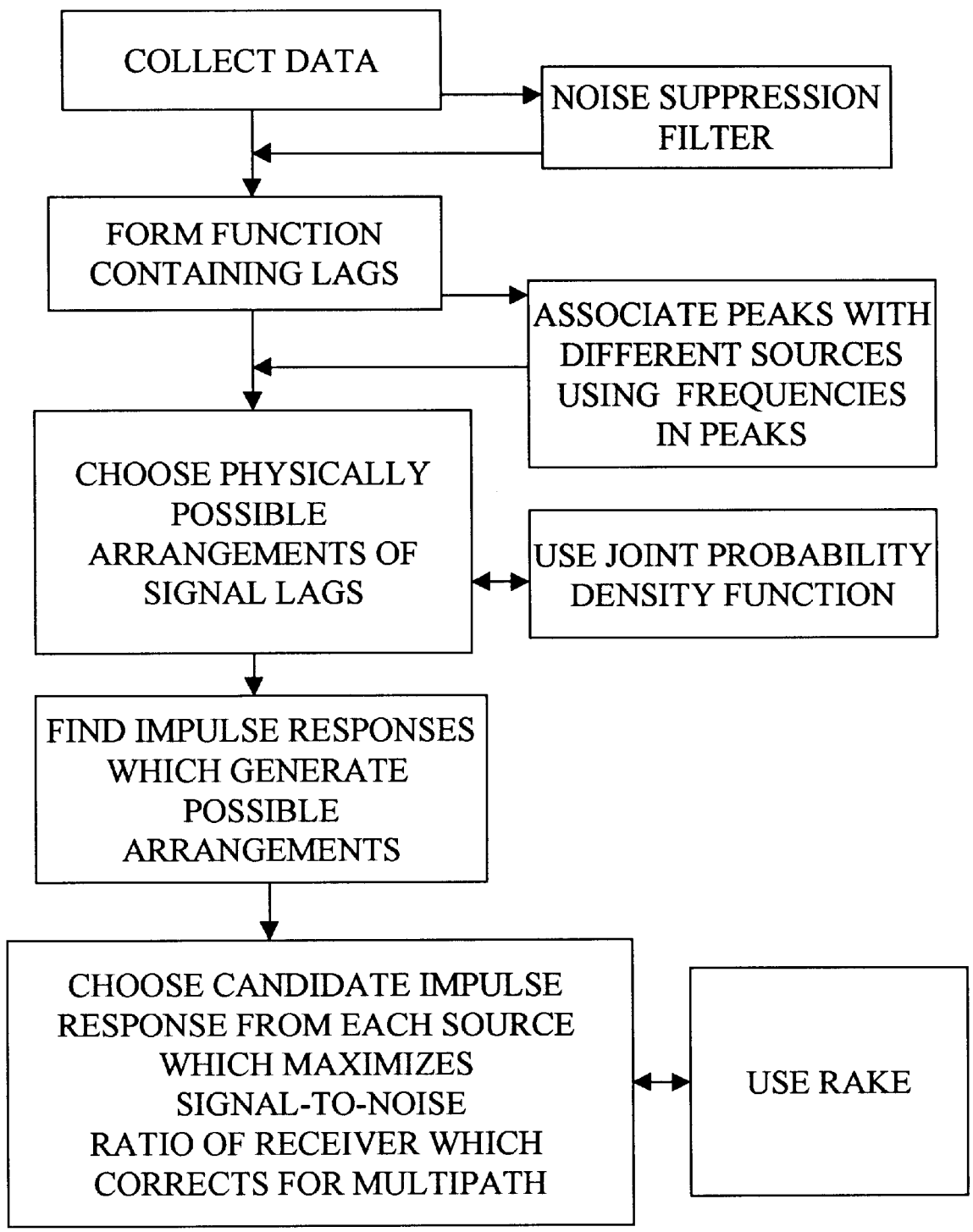
FIG. 4 depicts a block diagram of a blind method for estimating the impulse response for multipath conditions.
Figure 5:
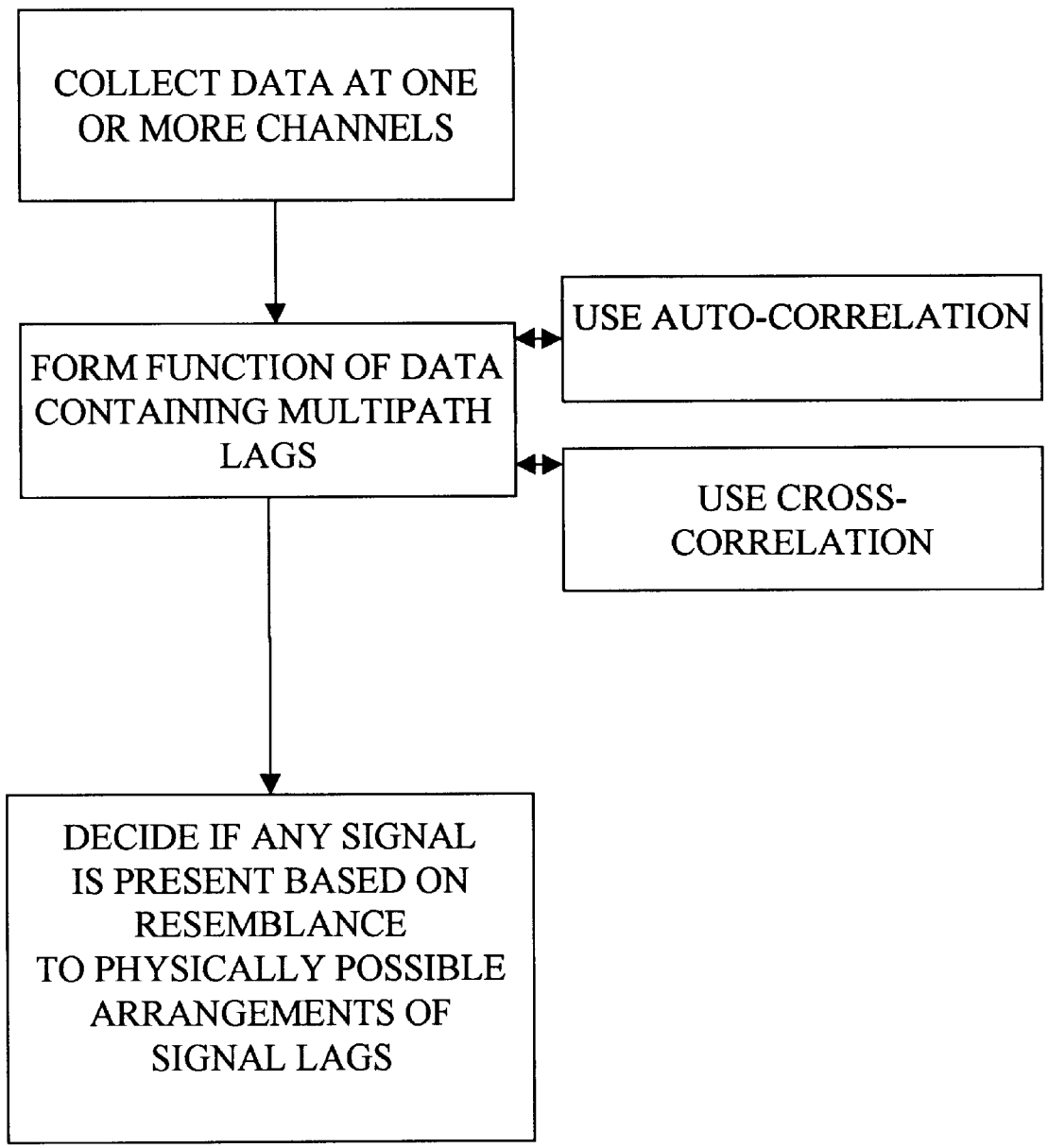
FIG. 5 depicts a block diagram of a communication system.

It is of interest to estimate how many products of uncorrelated Gaussian random variables there need to be in Eq. (A1) so that $R_{ij}(p)$ approaches a Gaussian random variable with variance given by Eq. (19). Using a standard method (Casella and Berger, *Statistical Inference*, 148–151, Wadsworth and Brooks/Cole, Pacific Grove, 1990), it can be shown that the density function of u, which is the product of two uncorrelated Gaussian random variables with mean zero and variance $\rho^2$, is, $$f(u) = \frac{1}{\pi\rho^2}\text{Bessel}K\left(0, \frac{u}{\rho^2}\right), u \geq 0 \quad (A3)$$

and $f(u) = f(-u)$. The modified Bessel function of the second kind of order zero is denoted BesselK(0,x). The function goes to infinity when x goes to zero. Note that the different products in Eq. (A1) are uncorrelated, but are not statistically independent. Monte-Carlo simulations are used to estimate the density of $R_{ij}(p)$. When there are 100 terms in the summation in Eq. (A1), the correlation value closely approaches normality with the theoretical variance given by Eq. (19) (FIG. 2).

The covariance, $$\overline{R_{ii}(p)R_{ij}(q)} = \frac{1}{K^2}\sum_{k=1+p}^{K}\sum_{l=1+q}^{K}\overline{e_i(k)e_i(k-p)e_i(l)e_j(l-q)}; \quad (A4)$$

$$p, q \geq 0,$$

vanishes because the noise is uncorrelated between receivers i and j (Sec. II). The conditional density functions of the data at one or two receivers can then be described as being mutually uncorrelated Gaussian random variables with mean zero and variance $\sigma_0^2$ as in Eqs. (21) and (23).

2. Signal Plus Noise

Consider the case where signal plus noise are present at the receiver. Substituting Eq. (16) into (2), and using Eqs. (17,18), we get for non-negative lags, $$R_{ij}(p) = K^{-1}\delta(t_i(m) - t_j(n))\sum_{m=1}^{N}\sum_{n=1}^{N}a_i(m)a_j(n)\mathcal{E} + \Delta_{ij}(p), \quad (A5)$$

where the component due to noise and reverberation is, $$\Delta_{ij}(p) \equiv K^{-1}\sum_{k=1+p}^{K}\sum_{m=1}^{N_i}e_j(k-p)a_i(m)s(k-t_i(m)) + \quad (A6)$$

$$K^{-1}\sum_{k=1+p}^{K}\sum_{n=1}^{N_j}e_i(k)a_j(n)s(k-p-t_j(n)) +$$

$$K^{-1}\sum_{k=1+p}^{K}e_i(k)e_j(k-p).$$

The summation indices on k go from 1 to K+p for p less than zero. Taking the expected value of $\Delta_{ij}(p)$ over the noise, we see that its mean is zero. The variance of $\Delta_{ij}(p)$ reduces to, $$\overline{\Delta_{ij}^2(p)} = \frac{\rho_j^2}{K^2}\mathcal{E}\sum_{m=1}^{N_i}a_i^2(m) + \frac{\rho_i^2}{K^2}\mathcal{E}\sum_{n=1}^{N_j}a_j^2(n) + \rho_i^2\rho_j^2(K-|p|) + \quad (A7)$$

$$\frac{2\delta(i-j)\rho_j^2}{K^2}\mathcal{E}\sum_{m=1}^{N_j}\sum_{n=1}^{m-1}a_j(m)a_j(n)\delta(2p-t_j(m)+t_j(n)).$$

where the variance of the noise at receivers i is $\rho_i^2$, which, so far, is allowed to vary from receiver to receiver.

A simple case is considered. Assume that $a_i(n)$ equals a, $N_i$ equals N, $\rho_i^2$ equals $\rho^2$, and $|p| << K$. Then Eq. (A5) can be used to show that a resolved signal peak in the correlation function has amplitude A given by Eq. (34). Eq. (A7) becomes, $$\overline{\Delta_{ij}^2(p)} = \frac{\rho^4}{K} + \frac{2\rho^2 A}{K}[N + \delta(i-j)\delta(2p-t_j(m)+t_j(n))]; \quad (A8)$$

$$1 \leq n < m \leq N.$$

For auto-correlation functions, the variance is slightly non-stationary because it depends on the lag. The variance becomes more stationary as N increases.

It is convenient to introduce the time averaged signal-to-noise intensity ratio at each receiver, defined by, $$l^2 \equiv \frac{K^{-1}\sum_{k=1}^{K}Na^2s^2(k)}{K^{-1}\sum_{k=1}^{K}e^2(k)}, \quad (A9)$$

which simplifies to Eq. (36) using Eq. (34).

For cross-correlation functions, $i \neq j$ in Eq. (A8) and using Eq. (36) produces Eq. (44). For auto-correlation functions, i=j in Eq. (A83), and there is an additional term which contributes when $2p = t_j(n) - t_j(m)$. Since 2p is an even integer, and since there are about N(N−1)/2 positive signal lags in the auto-correlation function, about one-half of these signal lags happens to fall on even lag. So the average variance of the noise in the auto-correlation functions is a weighted average of (N(N−1)/2)/2=N(N−1)/4 terms which include the extra variance, and Q−N(N−1)/4 terms which do not have the extra variance. (Q is the number of positive lags used from the auto-correlation function.) The weighted average is then, $$\sigma_1^2 \equiv \frac{\frac{N(N-1)}{4}\left\{\frac{2\rho^2 A(N+1)}{K} + \frac{(\rho^2)^2}{K}\right\} + \left(Q - \frac{N(N-1)}{4}\right)\left\{\frac{2\rho^2 AN}{K} + \frac{(\rho^2)^2}{K}\right\}}{Q}, \quad \text{(A10)}$$

which simplifies to Eq. (35) with the use of Eq. (36).

The covariance of the non-signal components in the cross-correlation function can be computed in an analogous manner from Eq. (A6). When $a_i(m)=a$, $N_i=N$, and $\rho_i^2=\rho^2$, $$\overline{\Delta_{ij}(p)\Delta_{ij}(q)} = \sigma_0^2 \frac{l^2}{N}\left(\sum_{m=1}^{N}\sum_{n=1}^{N}\delta[p-q-(t_i(m)-t_i(n))] + \sum_{m=1}^{N}\sum_{n=1}^{N}\delta[p-q-(t_j(m)-t_j(n))] + 2\delta(i-j)\delta[p+q-(t_i(m)-t_i(n))]\right). \quad \text{(A11)}$$

The ratio of the covariance to the variance is, $$\frac{\overline{\Delta_{ij}(p)\Delta_{ij}(q)}}{\sigma_1^2} \sim O\left(\frac{l^2}{N}\right), \quad \text{(A12)}$$

which is small when $l^2 \ll 1$.

Similarly, the covariance between the non-signal components in the auto- and cross-correlation function is about, $$\overline{\Delta_{ii}(p)\Delta_{ij}(q)} \sim \frac{\sigma_0^2 l^2}{N}\left(\sum_{n=1}^{N}\sum_{m=1}^{N}\delta(p+q-(t_i(n)-t_j(m))) + \delta(p-q-(t_j(m)-t_i(n)))\right), \quad \text{(A13)}$$

when $a_i(m)=a$, $N_i=N$, and $\rho_i^2=\rho^2$. This covariance divided by the variance in the auto-correlation function (Eq. (35)) is, $$\frac{\overline{\Delta_{ii}(p)\Delta_{ij}(q)}}{\sigma_1^2} \sim O\left(\frac{2l^2}{N}\right), \quad \text{(A14)}$$

which is small when $l^2 \ll 1$.

APPENDIX B

NUMBER OF SYMMETRICAL TRAVEL TIME SETS

First consider all symmetrical travel time sets having $t(N)-t(1)=\tau$ where $N-1 \leq \tau \leq Q$. Travel times will be measured from zero to $\tau$, where $\tau$ is a sample number. It is convenient to talk about a signal in a "bin" where bins 0 and $\tau$ are filled with signals, leaving $N-2$ signals to put in the intervening bins in a symmetrical manner. All symmetrical sets must have signals in bins, $$n \text{ and } \tau-n; n=0,1,2,\ldots,\tau. \quad \text{(B1)}$$

There are four cases to consider.

In case 1, $\tau$ and $N$ are even. There cannot be a signal at bin $\tau/2$ otherwise $N$ would have to be odd. Work with bins $\tau/2+1$ through $\tau-1$, which are referred to as the upper half. Half of the remaining $N-2$ remaining signals must go in the upper half with the remaining going in the lower half to maintain symmetry according to Eq. (B1). The upper half contains $$\frac{\tau}{2}-1$$

bins, and there are, $$Y_1(\tau, N) = \begin{pmatrix} \frac{\tau}{2}-1 \\ \frac{N-2}{2} \end{pmatrix} \quad \text{(B2)}$$

ways of arranging the $$\frac{N-2}{2}$$

samples among them. In case 2, $\tau$ is even and $N$ is odd. There must be a signal in bin $\tau/2$. The are $$\frac{\tau}{2}-1$$

upper half bins, $$\frac{\tau}{2}+1$$

through $\tau-1$. They are filled with $$\frac{N-3}{2}$$

signals which can be done in, $$Y_2(\tau, N) = \begin{pmatrix} \frac{\tau}{2}-1 \\ \frac{N-3}{2} \end{pmatrix} \quad \text{(B3)}$$

ways to make a symmetrical set. In case 3, $\tau$ is odd and $N$ is even. There cannot be a signal in bin $\tau/2$. There are $$\frac{\tau-1}{2}$$

upper half bins, $$\frac{\tau-1}{2}+1$$

through $\tau-1$. These are filled with $$\frac{N-2}{2}$$

signals which can be done in, $$Y_3(\tau, N) = \begin{pmatrix} \frac{\tau-1}{2} \\ \frac{N-2}{2} \end{pmatrix} \quad \text{(B4)}$$

ways to make a symmetrical set. In case 4, $\tau$ and N are odd. It is impossible to construct a symmetrical set of travel times for this case.

The total number of symmetrical sets is computed by summing over all values of $\tau$, i.e. from N−1 to Q, $$B_S = \begin{cases} \sum_{n=1}^{\frac{Q-N}{2}+1} Y_1(N+2(n-1), N) + \\ \sum_{n=1}^{\frac{Q-N}{2}+1} Y_3(N-1+2(n-1), N); & N \text{ even, } Q \text{ even} \end{cases} \quad \text{(B5)}$$

which simplifies to, $$B_S = \left\{ \frac{2}{N}(Q-N+2) \begin{pmatrix} \frac{Q}{2} \\ \frac{N-2}{2} \end{pmatrix}; N \text{ even, } Q \text{ even.} \right. \quad \text{(B6)}$$

Results for other odd and even combinations of N and Q are similar (not shown).

CONCLUSIONS, RAMIFICATIONS AND SCOPE

Thus the reader will see that the detection method of the matched-lag filter offers a significantly better means for detecting multipath signals (having some bandwidth) in the presence of noise than any prior detection method when the emitted waveforms are not known ahead of time. It can be used to detect acoustic and electromagnetic signals, and can be used for communication purposes. The reader will see that the same detection method offers a new way to communicate data between at least one source and at least one receiver in multipath environments. The reader will also see that the new detection method offers a means for blindly estimating the impulse response of a channel between at least one source and at least one receiver.

In the foregoing specification, the matched-lag filter has been described with reference to specific exemplary embodiments thereof. The matched-lag filter is considered to have been described in such full, clear, concise and exact terms as to enable a person of ordinary skill in the art to make and use the same. It will be apparent to those skilled in the art, that a person understanding the matched-lag filter may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims, which particularly point out and distinctly claim the subject matter Applicants regard as their invention.

What is claimed is:

1. A method of detecting at least one primary signal in multipath conditions, comprising the steps of:

(a) collecting data from at least one input channel, (b) forming at least one function of said data whose output contains information about multipath lags from at least one of said primary signals, (c) evaluating the function output to see if it resembles at least one physically possible arrangement of signal lags thereby indicating the presence of at least one said primary signal;

where said physically possible arrangement of signal lags is generated by forming said lags from at least one set of modeled multipath travel times, $t_i(m)$; m=1, 2, ... $N_i \geq 1$, with said modeled travel time of path m to said channel i being $t_i(m)$, where at least one of the following equations is used to form said signal lags:

for said lags, $\tau_{ii}(m, n)$, at said channel i, $\tau_{ii}(m,n)=t_i(m)-t_i(n); m \neq n, 1 \leq m \leq N_i$ and $1 \leq n \leq N_i$, for said lags between said channels i and j, $\tau_{ii}(q,1)=\tau_{ij}(q,n)-\tau_{ij}(1,n); i \neq j$, or, $\tau_{ii}(1,q)=-\tau_{ij}(q,n)+\tau_{ij}(1,n); i \neq j$, where, i=1, 2, 3, ... R
   j=1, 2, 3, ... R
   n=1, 2, 3, ... $N_j$; for i<j
   n=1; for i>j
   q=2, 3, ... $N_i$, where said lag between said channels i and j from said paths k and l is $\tau_{ij}(k, l)=t_i(k)-t_j(l)$, and the number of said channels is R and at least one channel has more than one path, and, as an option, at least one amplitude of said signal lags is estimated from either deterministically or stochastically modeled multipath amplitudes, $a_i(m)$; m=1, 2, ... $N_i \geq 1$, where said amplitude of said path m at said channel i is $a_i(m)$;

whereby said data are evaluated for presence of at least one said primary signal on at least one said input channel.

2. The method of claim 1 wherein said evaluation of said function output is done using a receiver operating curve.

3. The method of claim 1 further including a filtering of said data to suppress noise.

4. The method of claim 1 further including a sorting of peaks by their frequency content in said function output into associations with separate said primary signals for simplifying the searching of said physically possible arrangements of signal lags.

5. The method of claim 1 wherein at least one of said functions is an auto-correlation function.

6. The method of claim 1 wherein at least one of said functions is a cross-correlation function when there are at least two said input channels.

7. The method of claim 1 further including estimating the number of said primary signals from said function output.

8. The method of claim 1 further including estimating said number of said multipath from at least one of said primary signals from said function output.

9. The method of claim 1 further including using said evaluation of said function output for communicating information between at least one said primary signal and at least one said input channel.

10. The method of claim 9 wherein a RAKE technique is used to correct for multipath aberrations.

11. A method for blindly estimating an impulse response in multipath conditions from at least one input channel and from at least one primary signal comprising the steps of:
  (a) collecting data from at least one said input channel,
  (b) forming at least one function of said data whose output contains information about multipath lags from at least one said primary signal,
  (c) choosing at least one physically possible arrangement of signal lags that is likely to be contained in the function output;
    where said physically possible arrangement of signal lags is generated by forming said lags from at least one set of modeled multipath travel times, $t_i(m)$; $m=1, 2, \ldots N_i \geq 1$, with said modeled travel time of path m to said channel i being $t_i(m)$, where at least one of the following equations is used to form said signal lags:
    for said lags, $\tau_{ii}(m, n)$, at said channel i, $$\tau_{ii}(m,n)=t_i(m)-t_i(n); m \neq n, 1 \leq m \leq N_i \text{ and } 1 \leq n \leq N_i,$$

for said lags between said channels i and j, $$\tau_{ii}(q,1)=\tau_{ij}(q,n)-\tau_{ij}(1,n); i \neq j,$$

or, $$\tau_{ii}(1,q)=-\tau_{ij}(q,n)+\tau_{ij}(1,n); i \neq j,$$

where,
      $i=1, 2, 3, \ldots R$
      $j=1, 2, 3, \ldots R$
      $n=1, 2, 3, \ldots N_j$; for $i<j$
      $n=1$; for $i>j$
      $q=2, 3, \ldots N_i$,
    where said lag between said channels i and j from said paths k and l is $\tau_{ij}(k, l)=t_i(k)-t_j(l)$, and the number of said channels is R and at least one channel has more than one path, and, as an option, at least one amplitude of said signal lags is estimated from either deterministically or stochastically modeled multipath amplitudes, $a_i(m)$; $m=1, 2, \ldots N_i \geq 1$, where said amplitude of said path m at said channel i is $a_i(m)$,
  (d) selecting at least one of said impulse responses that generated said physically possible arrangement of signal lags,
whereby at least one estimate of said impulse response is obtained.

12. The method of claim 11 further including the filtering of said data to suppress noise.

13. The method of claim 11 wherein at least one of said functions is an auto-correlation function.

14. The method of claim 11 further including a sorting of peaks in said function output by their frequency content into associations with separate said primary signals for simplifying the searching of said physically possible arrangements of signal lags.

15. The method of claim 11 wherein a joint probability density function of said function output is used to choose at least one said physically possible arrangement of signal lags.

16. The method of claim 11 wherein any multiple solutions for said impulse response are narrowed down to at least one said impulse response by selecting one said impulse response leading to the largest signal-to-noise ratio in a receiver which corrects said data for multipath aberrations.

17. The method of claim 16 wherein the RAKE technique is the method which corrects for said multipath aberrations.

18. A method of communicating information using at least one primary signal which propagates to at least one input channel in multipath conditions, comprising the steps of:
  (a) collecting data from at least one said input channel,
  (b) forming at least one function of said data whose output contains information about multipath lags from at least one said primary signal,
  (c) evaluating the function output to see if it resembles at least one physically possible arrangement of signal lags thereby indicating the presence of at least one said primary signal;
    where said physically possible arrangement of signal lags is generated by forming said lags from at least one set of modeled multipath travel times, $t_i(m)$; $m=1, 2, \ldots N_i \geq 1$, with said modeled travel time of path m to said channel i being $t_i(m)$, where at least one of the following equations is used to form said signal lags:
    for said lags, $\tau_{ii}(m, n)$, at said channel i, $$\tau_{ii}(m,n)=t_i(m)-t_i(n); m \neq n, 1 \leq m \leq N_i \text{ and } 1 \leq n \leq N_i,$$

for said lags between said channels i and j, $$\tau_{ii}(q,1)=\tau_{ij}(q,n)-\tau_{ij}(1,n); i \neq j,$$

or, $$\tau_{ii}(1,q)=-\tau_{ij}(q,n)+\tau_{ij}(1,n); i \neq j$$

where,
      $i=1, 2, 3, \ldots R$
      $j=1, 2, 3, \ldots R$
      $n=1, 2, 3, \ldots N_j$; for $i<j$
      $n=1$; for $i>j$
      $q=2, 3, \ldots N_i$,
    where said lag between said channels i and j from said paths k and l is $\tau_{ij}(k, l)=t_i(k)-t_j(l)$, and the number of said channels is R and at least one channel has more than one path, and, as an option, at least one amplitude of said signal lags is estimated from either deterministically or stochastically modeled multipath amplitudes, $a_i(m)$; $m=1, 2, \ldots N_i \geq 1$, where said amplitude of said path m at said channel i is $a_i(m)$;
whereby said information is communicated by evaluating the presence of at least one said primary signal.

19. The method of claim 18 wherein at least, one of said functions is an auto-correlation function.

20. The method of claim 18 wherein at least one of said functions is a cross-correlation function when there are at least two said input channels.

* * * * *